March 6, 1962  A. CHAVES, JR., ET AL  3,023,782
MECHANICAL FEEDBACK FLOW CONTROL SERVO VALVE
Filed Nov. 13, 1959  3 Sheets-Sheet 1
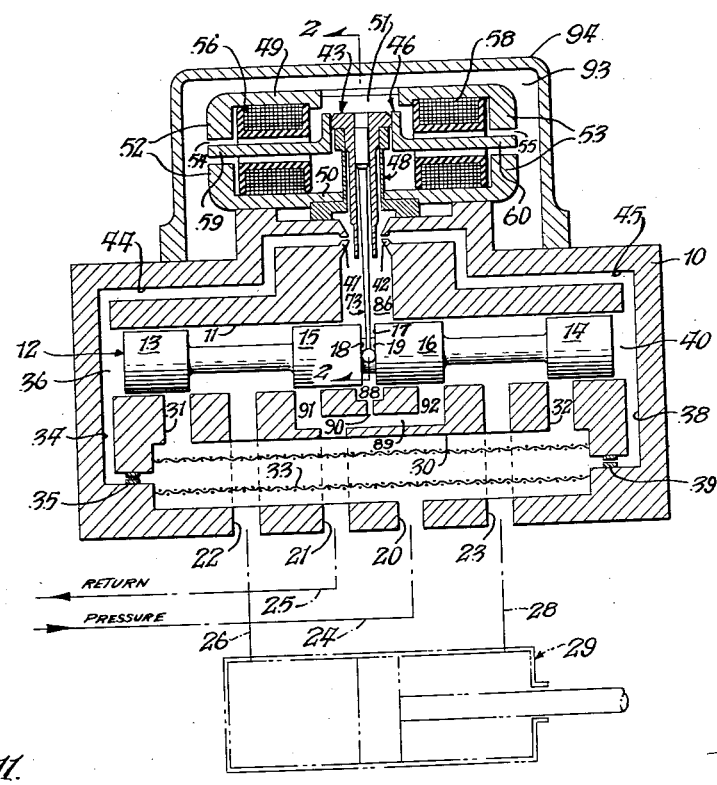
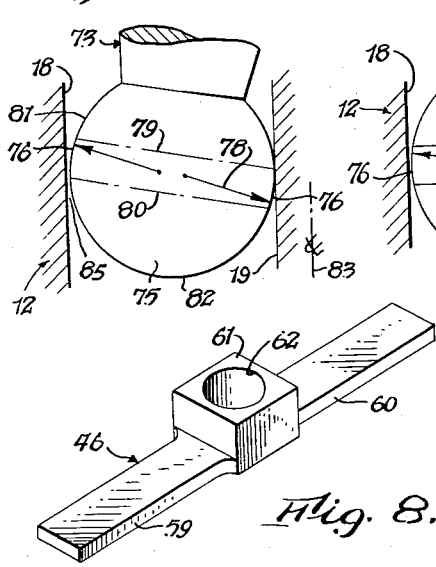
INVENTORS
Aurelius Chaves, Jr.
Donald I. Hall
BY Popp and Sommer
ATTORNEYS

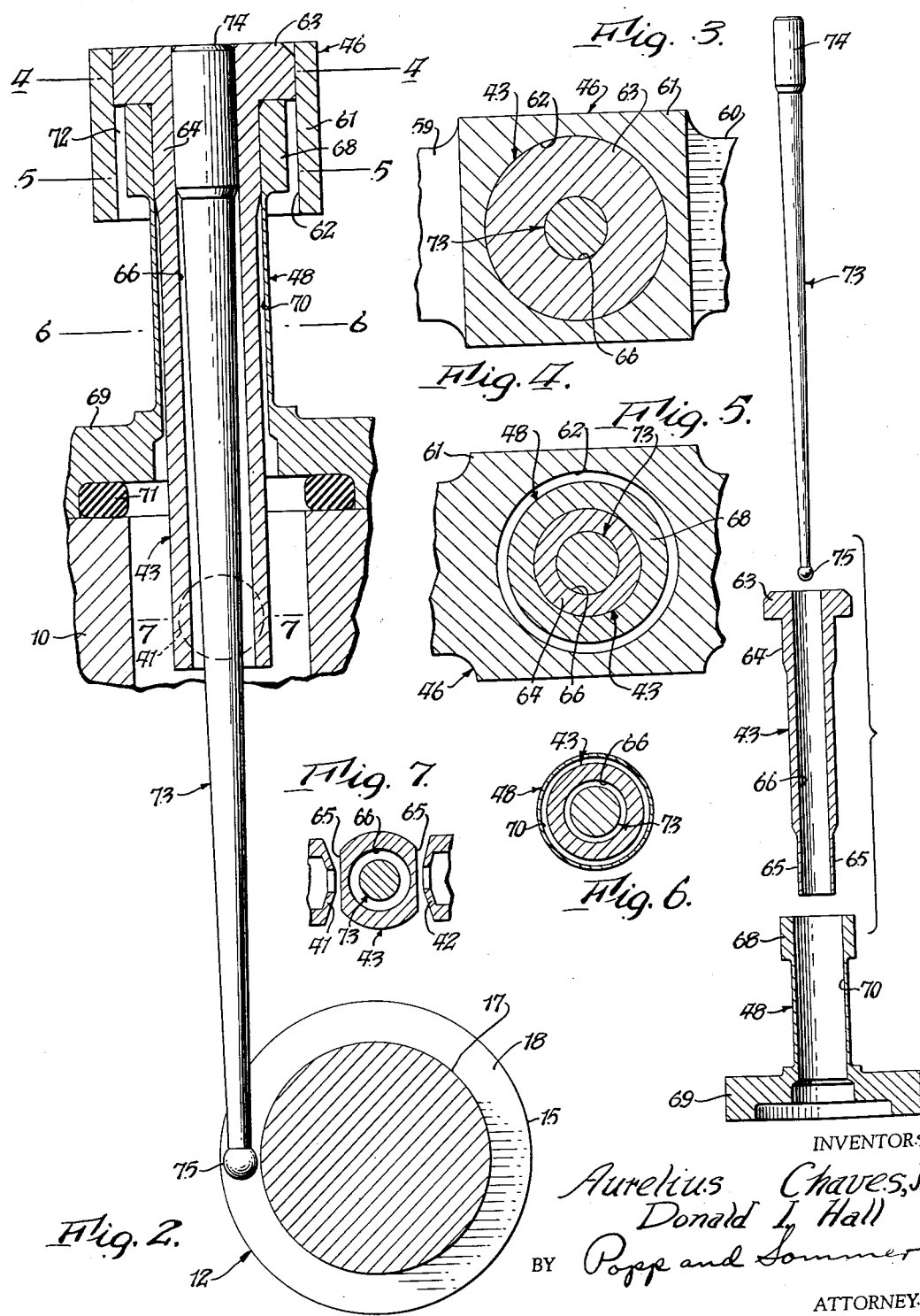

March 6, 1962 A. CHAVES, JR., ET AL 3,023,782
MECHANICAL FEEDBACK FLOW CONTROL SERVO VALVE
Filed Nov. 13, 1959 3 Sheets-Sheet 3

INVENTORS
Aurelius Chaves, Jr.
Donald I. Hall
BY Popp and Sommer
ATTORNEYS

United States Patent Office 3,023,782
Patented Mar. 6, 1962

3,023,782
MECHANICAL FEEDBACK FLOW CONTROL
SERVO VALVE
Aurelius Chaves, Jr., Lancaster, and Donald I. Hall, Tonawanda, N.Y., assignors to Moog Servocontrols, Inc., East Aurora, N.Y., a corporation of New York
Filed Nov. 13, 1959, Ser. No. 852,890
11 Claims. (Cl. 137—623)

This invention relates to improvements in electrically operated flow control servo valves, and more particularly to such a valve with an improved mechanical feedback.

An important object of the present invention is to provide a flow control valve with an internal mechanical feedback arrangement which yields a simplicity of parts.

Another object is to provide such a mechanical feedback flow control valve which is compact and rugged to withstand acceleration extremes.

A further object is to provide such a valve in which the torque motor is sealed in air and the magnetic fields created by such motor are isolated from fluid-filled regions.

Another object is to provide such a valve having a design symmetry for minimizing thermal null shift and thereby providing the valve with a wide temperature capability.

Another object is to provide such a valve which is stable enough to maintain a null or centered condition of the valve spool after the initial set-up of the valve is established, without requiring subsequent centering adjustments.

Other objects and advantages of the invention will be apparent from the following detailed description and accompanying drawings in which:

FIG. 1 is a vertical, central, longitudinal, sectional view through an electrically operated flow control servo valve embodying the present invention and illustrating the internal construction of the valve in a more or less diagrammatic manner, the valve spool being illustrated in elevation and in a null or centered position, and the valve being further depicted schematically in association with external fluid handling lines and equipment.

FIG. 2 is a greatly enlarged sectional view thereof taken generally along line 2—2 of FIG. 1.

FIG. 3 is an exploded view, on a reduced scale as compared with FIG. 2, of certain of the elements shown in FIG. 2, specifically the feedback spring wire, tubular flapper and flexure tube.

FIG. 4 is a fragmentary sectional view of the assembly shown in FIG. 2, being taken on line 4—4 thereof.

FIG. 5 is a similar fragmentary horizontal sectional view but taken along line 5—5 of FIG. 2.

FIG. 6 is a similar horizontal sectional view but taken on line 6—6 of FIG. 2.

FIG. 7 is a similar horizontal sectional view but taken on line 7—7 of FIG. 2.

FIG. 8 is a perspective elevational view of the armature member shown in FIG. 1.

FIG. 9 is a greatly enlarged, fragmentary, elevational view of the lower end of the feedback spring wire and schematically illustrating the same with respect to cooperating surface elements on the valve spool when the spool is in an ideal null or centered position.

FIG. 10 is a view similar to FIG. 9 but depicting the engagement between the end of the feedback spring wire and one of the surface elements on the valve spool when the spool is shifted or displaced to the right of null.

FIG. 11 is a view similar to FIG. 10 except for depicting a condition of the parts when the valve spool is displaced to the left of null.

Figure 12:
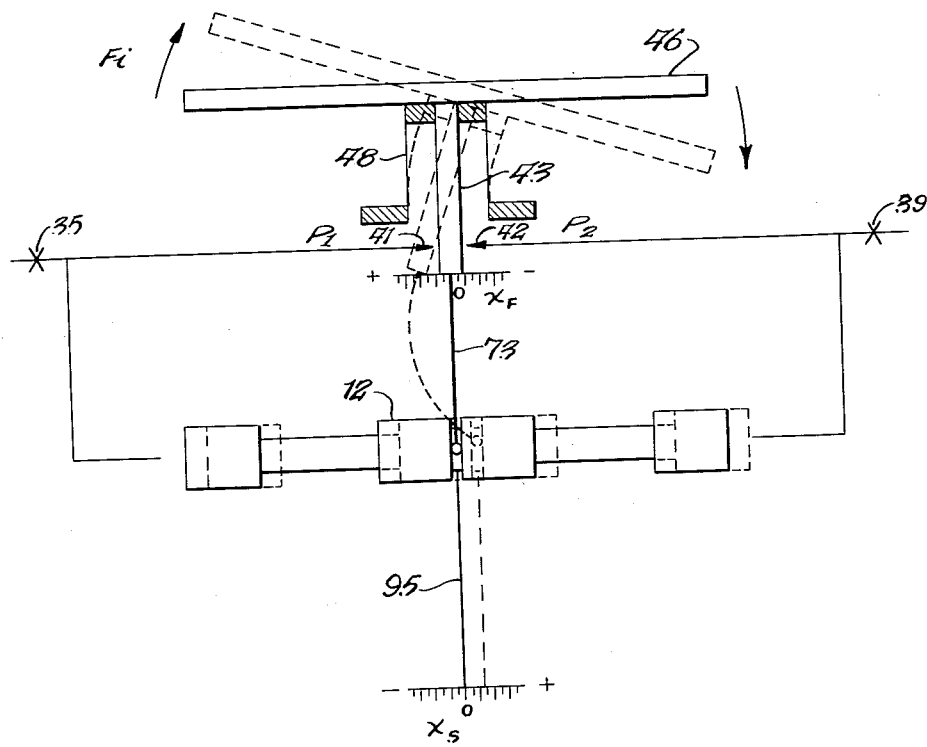
FIG. 12 is a schematic view of movable elements of the valve shown in two positions and in which motion is depicted in an overexaggerated manner.

The valve is shown as having a body 10 formed internally with a horizontal, elongated, cylindrical chamber 11 in which a valve spool indicated generally at 12 is slideably arranged. The valve spool 12 is shown as having cylindrical end lobes or lands 13 and 14 at opposite ends thereof and also a pair of intermediate cylindrical lobes or lands 15 and 16. The axially-facing end surfaces of the various lobes 13, 14, 15 and 16 are flat and radial with respect to the longitudinal axis of the valve spool. The opposing, flat and radially extending end faces of the intermediate lands 15 and 16 are indicated at 18 and 19, respectively, thereby providing an annular groove 17 therebetween.

The bottom of the valve body is shown as having four ports, one being a pressure port 20, another a return port 21, and the remaining two a pair of actuating ports 22 and 23. The pressure port 20 is shown schematically as connected to a line 24 which is adapted to supply a suitable fluid, whether a liquid or gas, under pressure to this port. The means such as a pump for placing the fluid under pressure are not shown. The return port 21 is shown as schematically connected to a line 25 which leads to a reservoir, pump sump or the like to which fluid discharged by the drain port 21 can be returned. The actuating ports 22 and 23 are shown severally and schematically as being connected by lines 26 and 28, respectively, to a piston and cylinder device or actuator, indicated schematically at 29. It will be understood that the piston of the device 29 is suitably connected to a load such as a control surface of an aircraft or missile (not shown).

The purpose of the servo valve embodying the present invention is to control the flow of fluid to and from the actuator 29 on opposite sides of the piston thereof through the lines 26 and 28, in turn connected to the actuating ports 22 and 23, respectively, of the valve.

The actuating port 22 communicates constantly with that portion of the chamber 11 between the lobes 13 and 15 of the valve spool. The other actuating port 23 communicates constantly with that portion of the chamber 11 between the lobes 14 and 16 of the valve spool. The pressure port 20 is shown as communicating with a horizontal, elongated, manifold chamber 30 provided in the valve body 10 to one side of the actuating ports 22 and 23, and also the return port 21. A branch passage 31 is shown as extending between the chambers 11 and 30. The end lobe 13 on the valve spool controls the communication between this branch line 31 and the chamber 11. In a similar manner, another branch line 32 connects the chambers 11 and 30. The end lobe 14 on the valve spool controls the communication between this branch line 32 and the chamber 11.

An elongated, tubular, fine mesh, screen filter 33 is shown as arranged horizontally and centrally within the manifold chamber 30. The opposite ends of the filter 33 are suitably closed by the end walls of the chamber 30. Thus fluid is filtered in passing from the exterior to the interior of the screen filter 33. A passage 34 in the valve body and having a restriction 35 therein is shown as establishing communication between the interior of the filter 33 and the portion of the chamber 11 laterally outwardly of the end lobe 13. Such end portion of the chamber is indicated at 36. Similarly at the other end of the valve body, the same is provided with a passage 38 having a restriction 39 which establishes communication between the interior of the filter 33 and that end portion of the chamber 11 laterally outward of the end lobe 14, such end chamber being indicated at 40.

The valve spool 12 serves as a second or output stage sliding spool of a fluid section which also includes a first stage hydraulic amplifier. This first stage hydraulic amplifier comprises a pair of opposing and spaced nozzles 41 and 42 fixedly mounted on the valve body 10 above the spool chamber 11 and the amplifier also includes a flapper indicated generally at 43. The interior or chamber of the nozzle 41 is shown as communicating with the spool end chamber 36 via a passage 44 provided in the valve body. Similarly the interior or chamber of the other nozzle 42 is shown as communicating with the spool end chamber 40 via the passage 45.

The flapper 43 is a rigid member and as best shown in FIG. 2 is tubular in form and mounted at its upper end on an armature member, also a rigid member and indicated generally at 46. Surrounding the tubular flapper 43 is a flexure tube member indicated generally at 48.

The armature member 46 is operatively associated with a polarized electrical force motor having an upper pole plate 49, a lower pole plate 50 and a pair of permanent magnets, one of which is typically illustrated at 51, interposed between the pole plates 49 and 50 and spaced from each other at opposite sides thereof. The corresponding ends of the vertically spaced pole plates 49 and 50 are bent to form opposing spaced pole pieces, those at one end being indicated at 52 and those at the other end at 53. The spaced pole pieces 52 provide an air gap 54 and the other pair of spaced pole pieces 53 provide a second air gap 55. Arranged between the pole plates 49 and 50 and adjacent the pole pieces 52 is a coil 56. A similar coil 58 is provided between the pole plates adjacent the pole pieces 53.

The construction of the armature member 46 is best understood by referring to FIG. 8. As there shown, this member comprises a pair of coplanar, magnetically permeable, plate portions 59 and 60 on opposite sides of an intermediate enlarged portion 61 provided with a central, vertical, through-hole 62. Referring to FIG. 1, it will be seen that the plate portion 59 of the armature member is surrounded by the coil 56 and enters the air gap 54 between the spaced pole pieces 52. The other plate portion 60 of the armature member is surrounded by the other coil 58 and its outer extremity enters the air gap 55 between the spaced pole pieces 53. The enlarged central portion 61 is shown as being square in outward configuration but any other suitable shape can be provided. Also as shown, this intermediate portion 61 rises entirely above the lower surfaces of the coplanar plate portions 59 and 60 of the armature member.

Now referring to FIGS. 2 and 3, the tubular flapper 43 is shown as having an enlarged cylindrical head 63 which is press-fitted into the hole 62 of the armature member. Immediately adjacent and below the head 63, the flapper 43 is provided with a cylindrical plug portion 64. The lower end portion of this flapper 43 is provided with a pair of flat surfaces 65, 65 on opposite sides of the flapper and opposing the tips of nozzles 41 and 42 as shown in FIG. 7. The purpose of each of these flats 65 is to provide a variable orifice jointly with the aperture of the corresponding nozzle 41 or 42. Such orifice is varied by positioning the flapper closer toward one nozzle while moving a corresponding distance farther away from the other nozzle. The intermediate portion of the flapper between the flats 65 and plug portion 64 is preferably cylindrical. The flapper is shown as having a cylindrical vertical bore 66 of uniform diameter extending completely through the flapper.

Also referring to FIGS. 2 and 3, the flexure tube member 48 is shown as having a thin walled intermediate portion with an outwardly extending, annular, enlargement or collar 68 at its upper end and an outwardly projecting, annular, attaching flange 69 at its lower end. The flexure tube 48 has a cylindrical through-passage or bore 70. The attaching flange 69 can be secured in any suitable manner to the upper surface of the valve body 10 as by screws (not shown) which pass through this flange and are anchored in the valve body. As shown in FIG. 2, a continuous sealing ring or rubber O-ring 71 is interposed between the attaching flange 69 and the valve body 10.

The plug portion 64 of the tubular flapper 43 is press-fitted into the upper end of the bore 70 of the flexure tube member 48 which is surrounded by the collar 68. An annular space 72 is shown in FIG. 2 as being provided between the collar 68 and wall of the bore 62 of the armature member.

The numeral 73 represents a feedback spring wire or rod which has a tapered shank connecting a cylindrical plug portion 74 at its upper end and an enlarged ball 75 at its lower end. The plug portion 74 is press-fitted into the upper end of the bore 66 of the tubular flapper 43. The ball 75 is received in the annular space 17 between the opposing faces 18 and 19 of the center lobes 15 and 16, respectively, of the valve spool 12.

Referring to FIG. 9, the ball 75 on the lower end of the feedback spring wire 73 has an outwardly rounded, contact surface 76 on opposite sides of the vertical center line of the feedback spring wire and opposite the corresponding faces 18 and 19. Each such face 76 is shown as generated spherically about a radius 78 having an axis slightly to one side of the vertical or longitudinal center line of the feedback spring wire 73. The partial spherical faces 76 are formed between upper and lower, transverse, imaginary planes 79 and 80, respectively. The ball 75 may be suitably transitionally contoured between the upper plane 79 and the lower end of the tapered shank portion of the feedback spring wire 73, as indicated at 81. The lower extremity of the ball 75 below the lower plane 80 may be formed in any suitable manner as long as it does not interfere with the effectiveness of the spherical surfaces 76. As shown such lower portion 82 is spherically contoured.

If desired, the ball 75 may be formed as a true sphere wherein the various surfaces 76, 81 and 82 are generated about a common radius. Thus the radii 78 would emanate from the same point.

In FIG. 9, the ball 75 on the lower end of the feedback spring wire 73 is shown ideally centered between the spaced and opposing surfaces 18 and 19 on the valve spool 12 which is also considered for purposes of explanation to be in a perfectly centered position so that the surfaces 18 and 19 are an equal distance from the centerline indicated at 83 and on opposite sides thereof. However, as a practical matter, the valve spool may not necessarily be centered when the ball is positioned as shown in FIG. 9. The rolling concept now to be described is present whether or not the ball 75 of the feedback spring wire 73 is either perfectly centered between the surfaces 18 and 19 or is biased against one or the other of these surfaces.

The spherical surfaces 76 are intended to have a frictionless engagement with either surface 18 or 19. In FIG. 10, the valve spool is depicted as being shifted to the right of the centerline 83 so that both of the surfaces 18 and 19 are to the right of such centerline. In moving from the centered position shown in FIG. 9 to the displaced position shown in FIG. 10, the feedback spring wire 73 bends or flexes with respect to the normally rectilinear, longitudinal, centerline of the feedback spring wire. In doing so, the left spherical surface 76 rolls on the surface 18 on the valve spool and an extremely slight clearance indicated at 84 is provided between the right spherical surface 76 and the surface 19 on the valve spool. Such clearance 84 is, of course, exaggerated in illustration and actually is not in excess of about .00005 inch. When in the condition shown in FIG. 10 the feedback spring wire 73 due to its being bent exerts a force on the valve spool 12 in a direction axially thereof through the contact between the left spherical surface 76 and the surface 18. Typically, the maximum displacement provided for the valve spool 12 to either side of the centerline 83 is about .02 inch.

Now assuming that the valve spool has been displaced to the left of the centerline 83 as depicted in FIG. 11, the surfaces 18 and 19 on the spool are both to the left of such centerline. The feedback spring wire 73 has now been flexed or bent so that the ball 75 on the lower end thereof is to the left of the normally rectilinear, longitudinal, centerline of this spring wire. Thus the right hand spherical surface 76 on the ball 75 engages the surface 19 and a slight clearance, indicated at 85, will now exist between the left spherical surface 76 and the surface 18. The clearance 85 is of the same magnitude as that mentioned for clearance 84. Here again, the right spherical surface 76 has a rolling contact with the surface 19 on the spool when the feedback spring wire 73 changes its attitude from that shown in FIG. 9 to that shown in FIG. 11, occasioned by an axial shift or displacement of the valve spool from its null or centered position to the left thereof.

Reverting to FIG. 2, it will be seen that the feedback spring wire 73 projects downwardly below the lower end of the tubular flapper 43. Likewise, the tubular flapper 43 projects downwardly beyond the lower end of the flexure tube member 48.

Referring to FIG. 1, it will be seen that the nozzles 41 and 42 discharge fluid into a chamber 86 formed in the valve body 10 and which is shown as having its lower end opening to and connecting with the spool chamber 11. Arranged below the center portion of the valve spool 12, the valve body 10 is provided with a chamber 88 which has its upper end opening to and connecting with the spool chamber 11. The axial extent of the ends of the chambers 86 and 88 adjacent the spool chamber 11 is greater than the axial distance between the opposing faces 18 and 19 on the valve spool. The annular space 17 between these surfaces 18 and 19 serves as a constant connection between the chambers 86 and 88 in all axial positions of the valve spool 12. The valve body 10 is also shown as being formed so that the lower end of the chamber 88 is connected to a passage 89 by a restricted orifice 90. This orifice 90 minimizes the effects of back surges in the return line and improves the discharge flow characteristics of the nozzles 41 and 42 by maintaining a back pressure in the chamber 86. The passage 89 at one end has an upward branch 91 which opens to the spool chamber 11 adjacent the outer end of the left center lobe 15 on the valve spool. At its other end, the passage 89 has an upward branch 92 which opens to the spool chamber 11 adjacent the outer end of the right center lobe 16. The return port 21 is shown as communicating with the passage 89 intermediate the ends thereof, the port or passage 21 extending past the horizontal manifold chamber 30 to one side thereof.

The adjacent sides of the passages 31 and 91 are flat sided in actuality so as to serve as metering ports. The axial spacing between the opposite faces of the lobes 13 and 15 is equal to the axial spacing between the adjacent sides of the passages 31 and 91. Similarly, the axial distance between the opposing end faces on the lobes 14 and 16 corresponds to the axial distance between the adjacent sides of the passages 32 and 92, which like the others, 31 and 91, are flat sided so as to act as metering ports when the spool lobes uncover them. With the valve spool 12 in a null or centered position as illustrated, the lobe 13 covers and completely closes the metering port 31, as does the lobe 15 with respect to the metering port 91, the lobe 16 with respect to the metering port 92, and the lobe 14 with respect to the metering port 32.

When there is no input current to the coils 56 and 58, and a suitable fluid such as oil under pressure is being supplied to the pressure port 20 via the line 24, no oil except normal leakage will flow through any of the ports 31, 32, 91 and 92, these ports being blocked by the lobes 13, 14, 15 and 16, respectively. Oil filtered by the screen filter 33 is supplied to the nozzles 41 and 42 via the passages 34, 44 and 38, 45, respectively. Pressures created upstream of the nozzles are applied to the ends of the valve spool.

The manner of connection of the coils 56 and 58 of the polarized electrical force motor is understood by those skilled in the art. Typically, input current is considered to be the differential current between the two motor coils. Quiescent current levels from zero to approximately twice rated current may be used. The coils may be operated in series or parallel aiding with zero quiescent current. With a series coil connection, full valve output will be achieved with one-half rated differential current input. The input current is typically measured in milliamperes.

*Operation*

The operation of the improved valve is believed best understood by first referring to FIG. 12 which schematically depicts an initial position of certain movable parts of the valve in which position the parts are represented by full lines, and a displaced position in which the parts are represented by broken lines. The armature 46 and flapper 43 are there shown as a rigid T-shaped member supported on the flexure tube 48 and to the lower end of which member the upper end of the depending feedback spring wire 73 is shown as secured.

The lower end of the flapper or upper end of the feedback spring wire traverses a scale designated $x_F$ which represents the displacement of this member through small angles. This permits a simplified explanation of the operation if it is assumed that there is linearity of such effects as permanent magnet forces and hydraulic forces and neglecting dimensional differences due to angular motion of the armature-flapper member.

The lower end of the feedback spring wire has a frictionless connection to the valve spool 12 displacement of which is depicted by a pointer 95 adapted to traverse a scale designated $x_S$ which represents the displacement of the valve spool. $P_1$ and $P_2$ represent the pressures of the nozzles 41 and 42 and these nozzle pressures are schematically shown in FIG. 12 as applied severally to the ends of the valve spool 12.

Let it now be assumed that:

$k_1$=centering stiffness of the flexure tube 48 acting on the armature-flapper member, i.e. force per unit displacement of $x_F$
$k_2$=centering effect of hydraulic amplifier due to nozzle differential pressure acting on armature-flapper member, i.e. force per unit displacement of $x_F$
$k_3$=stiffness due to bending of the feedback spring wire 73
$k_4$=decentering effect of permanent magnet motor, i.e. force per unit displacement of $x_F$
$F_i$=force due to current input to motor (proportional to current)

It follows that $F_i$ is equal to the sum of all other forces acting on the armature-flapper member. Thus $$F_i = k_1 x_F + k_2 x_F + k_3(x_F + x_S) - k_4 x_F$$

With ideal rate cancellation, as is preferred:

$$k_1 x_F + k_2 x_F + k_3 x_F = k_4 x_F$$

so that $$F_i = k_3 x_S$$

In other words, the valve spool displacement ($x_S$) is proportional to the force due to the current input ($F_i$) since the stiffness or spring rate of the feedback spring wire ($k_3$) is a constant. This is achieved by constructing the valve so that the decentering force of the permanent magnets ($k_4 x_F$) is substantially counterbalanced by the sum of the centering force of the flexure tube ($k_1 x_F$), the centering force of the nozzle differential pressure ($k_2 x_F$) and the centering force exerted by the bent feedback spring wire due solely to its upper end being displaced laterally ($k_3 x_F$). With the valve spool held stationary and no current input, this means that the rigid armature-flapper member can be positioned so that the armature is located anywhere in the air gaps and the flapper correspondingly anywhere between the nozzle tips, and remain there with all forces acting on this member being in equilibrium. This is what is meant by "rate cancellation."

Viewed in still another light, with rate cancellation as above described, the valve spool 12 will move until it bends the feedback spring wire 73 enough to apply a torque on the rigid armature-flapper member which counterbalances the torque applied thereto induced by the electrical current input. This, it will be noted, is irrespective of the actual difference between the pressures $P_1$ and $P_2$ which can vary due to resistance to movement of the valve spool. Torque equilibrium on the armature-flapper member will provide a differential pressure across the valve spool 12 sufficient to hold the spool in the presence of mechanical force exerted by the feedback spring wire and any flow reaction forces resulting from flow through the metering ports to and from the load or actuator. To maintain such torque equilibrium the differential pressure across the valve spool may vary.

Assume an electrical signal is applied to the motor coils so as to apply a torque on the armature-flapper member in a clockwise direction as viewed in FIG. 12. This member is caused to pivot about the flexure tube support. The resulting motion at the flapper causes the left nozzle to close and the right nozzle to open. In consequence, flow is directed to the left end of the valve spool causing spool displacement to the right. As the spool moves from the centered position, a torque proportional to spool displacement is applied to the armature-flapper member by the feedback spring wire. This torque opposes that developed by the motor and a condition of torque equilibrium will exist when the feedback spring torque equals the electrical motor torque.

Assume further that the load or actuator is blocked so that there is no flow through the metering ports. In this condition, there is a torque balance on the armature-flapper member with the flapper positioned between the nozzles so as to develop a certain differential pressure across the valve spool.

Assume now that the load or actuator is suddenly unblocked with flow to and from the load through actuating ports 22 and 23. This produces flow reaction forces which tend to recenter the spool or return it to its null position. This upsets the torque balance on the armature-flapper member since the flow reaction forces tend to relax or unflex the feedback spring wire. As a consequence, the flapper will move toward the left nozzle so as to increase the differential pressure across the spool thereby counteracting the flow reaction forces and keeping the spool displaced in order to maintain the feedback spring wire bent and maintain the torque balance on the armature-flapper member.

Referring to FIG. 1, assume now that an input current is applied to the coils 56 and 58 such that the end portion 59 of the armature member rises while the other end portion 60 thereof lowers. In other words, the armature member 46 is pivoted in a clockwise direction as viewed in FIG. 1. This pivotal movement of the armature member 46 is permitted by a bending or flexing of the flexure tube member 48 which is supporting the assembly constituted by the armature member, the flapper 43 and feedback spring wire 73. The flexure tube member 48 exerts a resistance to being so bent or flexed. The mounting of the armature member and associated members on the upper end of the flexure tube member 48 thus provides a pivotal axis for this assembly when the flexure tube member is bent or deflected by a torque applied to the armature member about an axis extending perpendicular to the central, longitudinal axis of the flexure tube member and intermediate the ends thereof.

With the armature member 46 pivoted in a clockwise direction as viewed in FIG. 1, it will be seen that the flapper 43 will be pivoted in a clockwise direction so that the lower end of this flapper moves closer to the aperture of the nozzle 41 and correspondingly farther away from the aperture of the other nozzle 42. This movement of the lower end of the flapper relative to the nozzles reduces the size of the variable orifice formed jointly by the flat surface 65 and the tip of the nozzle 41, and increases the effective size of the variable orifice provided jointly by the other flat surface 65 on the flapper and the tip of the nozzle 42. This has the effect of blocking the discharge of the fluid from the nozzle 41 and relieving obstruction to the discharge of the fluid from the nozzle 42. As a consequence, a pressure differential is produced in the nozzle chambers with the higher pressure being in the chamber of the left nozzle 41. This pressure differential is applied to the spool end chambers 36 and 40, with the higher pressure being in the left spool end chamber 36. The net force hydraulically applied to the valve spool 12 will cause the same to shift to the right of the null or centered position, as depicted in FIGS. 10 and 12. When this occurs, metering ports 32 and 91 are uncovered while ports 31 and 92 remain closed. Thus pressurized fluid is metered by the port 32 into the actuating port 23 which is conducted to the right side of the piston in the actuator 29, while the left side of such piston is connected to the drain port 21 by reason of the establishment of communication between the actuating port 22 and return metering port 91. Flow to the actuator 29 through the actuating ports 22, 23 is proportional to displacement of the spool from a centered or null position for a constant valve pressure drop.

Such displacement of the valve spool 12 to the right due to the differential pressure applied to the ends of the spool with the net force acting in a direction from left to right, will continue until the feedback spring wire 73 has been bent sufficiently to apply a torque to the armature-flapper member which counterbalances the torque induced by the signal current input, leaving the flapper in a slightly off-centered position. While the upper end of the cantilever-mounted, feedback spring wire 73 has been pivoted in a clockwise direction as viewed in FIG. 1, along with the armature member 46 and flapper 43, the hydraulically induced motion of the valve spool 12 from left to right will cause the lower end of the feedback spring wire 73 to be flexed to the right of the centerline of this normally straight feedback spring wire, as depicted in FIG. 10. As previously explained, the ball 74 on the lower end of the feedback spring wire has a rolling contact with the surface 18 on the valve spool 12 thereby providing a frictionless connection while constraining the lower end of the feedback spring wire to move with the spool. The slightly off-centered position in which the flapper has been left produces a pressure differential across the valve spool the net effect of which is offset by the mechanical force exerted by the feedback spring wire against the valve spool and any flow reaction forces.

Assume now that the valve is back in the null condition illustrated in FIG. 1 and that an input current is subsequently applied to the coils 56 and 58 so as to cause the armature member 46 and associated flapper member 43 and feedback spring wire 73 mounted thereon, to pivot in a counter-clockwise direction as viewed in FIG. 1 against the urging of the flexure tube member 48. Thus, the left end portion 59 of the armature member approaches the lower pole piece 52 while the right end portion 60 approaches the upper pole piece 53. The pivotal motion in a counter-clockwise direction is permitted by a flexing or bending of the flexure tube 48. This brings the flapper 43 closer to the right nozzle 42 and farther away from the left nozzle 41. A pressure differential is thereby established in the nozzle chambers with the predominant or higher pressure in the right nozzle chamber 42. This pressure differential is applied to the ends of the spool via the lines 44 and 45 so that the higher pressure is in the right spool end chamber 40 and the lower pressure is in the other spool end chamber 36, The valve spool 12 is now hydraulically driven from right to left as viewed in FIG. 1. When this occurs the metering ports 31 and 92 are uncovered while the metering ports 32 and 91 are kept closed, by the various lobes on the valve spool. Pressurized fluid will now be metered by the port 31 into the actuating port 22 to the left side of the piston in the actuator 29. The fluid on the right side of this piston is returned through the actuating port 23 communicating with the uncovered return metering port 92.

Displacement of the spool to the left will continue until the feedback spring wire 73 has been bent or flexed so that it is to the left of the normally straight centerline of this spring wire, as depicted in FIG. 11, and there is a force balance on the rigid armature-flapper member. A force balance on the valve spool is also provided between the hydraulic drive force and the mechanical feedback force and any flow reaction forces. As a result, the valve spool will be disposed in a uniquely displaced position to the left of its null or centered position.

It will be noted that the flexure tube member 48 not only provides a pivotal mounting for the armature member 46, flapper member 43 and feedback spring wire 73 but seals the motor section from the fluid section. The motor section is arranged in air in a chamber 93 provided by a cover 94 which may be suitably secured removably to the valve body 10.

The pivotal axis of the rigid armature-flapper member may be considered to be approximately halfway between the ends of the thin-walled portion of the flexure tube. A desirable feature of the construction of armature, flapper and feedback spring wire assembly illustrated is that the center of gravity of this assembly is substantially coincident with the pivotal axis referred to above. As a consequence, this assembly is mass-balanced and inertia forces will not be effective to deleteriously influence the performance of the valve.

From the foregoing, it will be seen that the present invention provides an electrically operated flow control servo valve having a polarized electrical force motor section and a fluid section isolated from each other by a flexure member which also serves as a support for a rigid armature movable with respect to spaced pole pieces of the motor, the fluid section including a first stage hydraulic amplifier constituted by the pair of nozzles and intermediate flapper, and an output stage unitary sliding spool. The flapper is joined to the armature to provide a rigid armature-flapper member. A feedback spring member is also provided with one of its ends being fixedly connected to the armature-flapper member and having its other end frictionlessly connected to the center of the unitary spool and thereby constrained to move therewith.

It will further be seen that the inventive valve achieves the stated objects and in particular has the desirable features of high performance, simplification and compactness, together with a wide temperature capability.

In a conventional closed loop position control system, servo valve flow is applied to a hydraulic piston or motor, driving a load. Load position is measured electrically and fed back for comparison with a signal representing the desired position. Resulting error signal is amplified, providing current input to the servo valve to control flow. The inventive valve is well suited to applications requiring precise control at high power levels in such a system. These applications include flight control systems for military aircraft and missiles, nuclear reactor control devices, and a wide range of industrial installations where small size together with high performance are essential.

What is claimed is:

1. In an electrically operated flow control servo valve, the combination comprising a polarized electrical force motor section including spaced pole pieces, permanent magnet means associated with said pole pieces and an armature movably arranged between said pole pieces, a fluid section including a first stage hydraulic amplifier and an output stage sliding spool, said hydraulic amplifier including a flapper and a pair of fixed nozzles in spaced relation to different surface portions of said flapper to provide variable orifices for discharging fluid, said armature and flapper being joined to provide a rigid member, a flexure member supporting said armature-flapper member, and a feedback spring member fixedly connected at one end to said armature-flapper member and frictionlessly connected at its other end to said spool, the decentering action on said armature-flapper member by said permanent magnet means substantially offsetting the combined centering action which includes the spring rates of said flexure member and hydraulic amplifier whereby the force exerted on said armature-flapper member by said feedback spring member is substantially proportional to the force exerted on said armature-flapper member by the electrical input to said motor section and thereby render spool displacement proportional to electrical input.

2. In an electrically operated flow control servo valve, the combination comprising a polarized electrical force motor section including spaced pole pieces, permanent magnet means associated with said pole pieces and an armature movably arranged between said pole pieces, a fluid section including a first stage hydraulic amplifier and an output stage sliding spool, said hydraulic amplifier including a flapper, said armature and flapper being joined to provide a rigid member, a flexure tube supporting said armature-flapper member, and a feedback spring member fixedly connected at one end to said armature-flapper member and frictionlessly connected at its other end to said spool, said flexure tube sealing said motor section from said fluid section, the decentering action on said armature-flapper member by said permanent magnet means substantially offsetting the combined centering action which includes the spring rates of said flexure tube and hydraulic amplifier.

3. In an electrically operated flow control servo valve, the combination comprising a polarized electrical force motor section including spaced pole pieces and an armature movably arranged between said pole pieces, a fluid section including a first stage hydraulic amplifier and an output stage unitary sliding spool, said hydraulic amplifier including a flapper, said armature and flapper being joined to provide a rigid member, means supporting said armature-flapper member for pivotal movement, and a feedback spring member fixedly connected at one end to said armature-flapper member and frictionlessly connected at its other end to the center of said spool.

4. In an electrically operated flow control servo valve, the combination comprising a polarized electrical force motor section including spaced pole pieces and an armature movably arranged between said pole pieces, a fluid section including a first stage hydraulic amplifier and an output stage sliding spool, said hydraulic amplifier including a flapper, said armature and flapper being joined to provide a rigid member, a flexure tube supporting said armature-flapper member, said flapper being arranged within said flexure tube, and a feedback spring member fixedly connected at one end to said armature-flapper member and having its other end constrained to move with said spool.

5. In an electrically operated flow control servo valve, the combination comprising a polarized electrical force motor section including spaced pole pieces and an armature movably arranged between said pole pieces, a fluid section including a first stage hydraulic amplifier and an output stage sliding spool, said hydraulic amplifier including a tubular flapper, said armature and flapper being joined to provide a rigid member, a flexure tube supporting said armature-flapper member, said flapper being arranged within said flexure tube, and a feedback spring member arranged within said tubular flapper with one end of said spring member being cantilever-mounted on said armature-flapper member and the other end of said spring member being constrained to move with said spool.

6. In an electrically operated flow control servo valve, the combination comprising a polarized electrical force motor section including spaced pole pieces and an armature movably arranged between said pole pieces, a fluid section including a first stage hydraulic amplifier and an output stage sliding spool, said hydraulic amplifier including a pair of opposing, spaced and fixed nozzles and a tubular flapper having a tip portion movably arranged therebetween, said armature and flapper being joined to provide a rigid member, a flexure tube surrounding a portion of said flapper and supporting said armature-flapper member, said tip portion of said tubular flapper being exterior of said flexure tube, and a feedback spring member having a portion arranged within said tubular flapper, one end of said spring member being cantilever-mounted on said armature-flapper member and the other end of said spring member being constrained to move with said spool.

7. In an electrically operated flow control servo valve, the combination comprising a polarized electrical force motor section including spaced pole pieces and an armature movably arranged between said pole pieces, a fluid section including a first stage hydraulic amplifier and an output stage sliding spool having a socket therein, said hydraulic amplifier including a flapper, said armature and flapper being joined to provide a rigid member, a flexure tube supporting said armature-flapper member, and a feedback spring member having at one end an outwardly rounded surface adapted to have rolling contact with the wall of said socket when said spool slides, the other end of said spring member being cantilever-mounted on said armature-flapper member.

8. In an electrically operated flow control servo valve, the combination comprising a polarized electrical force motor section including spaced pole pieces and a rigid armature movably arranged between said pole pieces and having plate portions extending laterally from opposite sides of an intermediate portion having a recess, a flexure tube having an attaching flange portion at one end and an enlarged collar at its other end, a fluid section including a first stage hydraulic amplifier and an output stage sliding spool, said hydraulic amplifier including a tubular flapper extending through said flexure tube and having an enlarged head at one end and a plug portion adjacent said head, said head plugging said recess in said armature, said plug portion plugging said flexure tube at its said other end, and a feedback spring member having a plug portion at one end plugging said one end of said tubular flapper, said spring member extending through said tubular flapper and having its other end constrained to move with said spool.

9. In an electrically operated flow control servo valve, the combination comprising a polarized electrical force motor section including an armature having plate portions extending laterally from one end of a tubular intermediate portion, a fluid section including a first stage hydraulic amplifier and an output stage sliding spool, a flexure tube having an enlarged collar at one end arranged within said tubular intermediate portion, said hydraulic amplifier including a tubular flapper extending through said flexure tube and having an enlarged head at one end and a plug portion adjacent said head, said head plugging said tubular intermediate portion adjacent that end thereof remote from said plate portions, and a feedback spring member having a plug portion at one end plugging said one end of said tubular flapper, said spring member projecting from the end of said tubular flapper opposite from said one end thereof and having its other end constrained to move with said spool.

10. In an electrically operated flow control servo valve, the combination comprising a polarized electrical force motor section including spaced pole pieces providing a pair of air gaps, permanent magnet means operatively interposed between said pole pieces, an armature movably arranged between said pole pieces and having end portions severally entering said air gaps and a pair of coils severally surrounding said end portions and operatively associated with said pole pieces, a fluid section including a first stage hydraulic amplifier and an output stage sliding spool, said hydraulic amplifier including a flapper, said flapper being joined to said armature intermediate said end portions thereof to provide a rigid member, a flexure tube mounting said armature-flapper member, and a feedback spring member at one end cantilever-mounted on said armature-flapper member and having its other end constrained to move with said spool.

11. In an electrically operated flow control servo valve, the combination comprising a body, a polarized electrical force motor section including spaced pole pieces providing a pair of air gaps, permanent magnet means operatively interposed between said pole pieces, an armature member movably arranged between said pole pieces and having end portions severally entering said air gaps and a pair of coils severally surrounding said end portions and operatively associated with said pole pieces, a flexure tube at one end mounting said armature member intermediate said end portions thereof and having its other end mounted on said body, a fluid section including a first stage hydraulic amplifier and an output stage spool slidably arranged within a chamber provided within said body, said hydraulic amplifier including a pair of opposing and spaced nozzles for discharging fluid fixedly mounted on said body and a tubular flapper rigidly extending through said flexure tube and having one end rigidly attached to said armature member intermediate said end portions thereof and having its other end extending between said nozzles and operative to control the flow of fluid therefrom, means establishing communication severally between said nozzles and opposite ends of said chamber whereby any pressure differential developed by said hydraulic amplifier is applied to opposite ends of said spool, and a feedback spring member at one end plugging said one end of said tubular flapper and the other end of said spring member being constrained to move with said spool.

References Cited in the file of this patent
UNITED STATES PATENTS

| | | |
|---|---|---|
| 2,790,427 | Carson | Apr. 30, 1957 |
| 2,824,574 | Place | Feb. 25, 1958 |
| 2,835,265 | Brandstadter | May 20, 1958 |
| 2,884,906 | Atchley | May 5, 1959 |